United States Patent
Zhou et al.

(10) Patent No.: US 8,075,671 B2
(45) Date of Patent: Dec. 13, 2011

(54) SUPPORTED METAL MEMBRANE WITH INTERNAL COOLING FOR $H_2$ SEPARATION

(75) Inventors: Shaojun James Zhou, Palatine, IL (US); Howard S. Meyer, Hoffman Estates, IL (US)

(73) Assignee: Gas Technology Institute, Des Plaines, IL (US)

( * ) Notice: Subject to any disclaimer, the term of this patent is extended or adjusted under 35 U.S.C. 154(b) by 339 days.

(21) Appl. No.: 12/479,906

(22) Filed: Jun. 8, 2009

(65) Prior Publication Data

US 2010/0307333 A1    Dec. 9, 2010

(51) Int. Cl.
*B01D 53/22*    (2006.01)

(52) U.S. Cl. .................. 95/56; 95/45; 96/4; 96/8; 96/10; 96/11; 96/12

(58) Field of Classification Search ................ 95/45, 55, 95/56, 149, 230; 96/4, 8, 10, 11, 12, 14, 96/243; 55/482.1, 490.1
See application file for complete search history.

(56) References Cited

U.S. PATENT DOCUMENTS

| | | |
|---|---|---|
| 1,174,631 A | 3/1916 | Snelling |
| 2,773,561 A | 12/1956 | Hunter |
| 4,057,402 A | 11/1977 | Patel et al. |
| 4,369,045 A | 1/1983 | Vorres |
| 4,592,762 A | 6/1986 | Babu et al. |
| 4,699,632 A | 10/1987 | Babu et al. |
| 4,804,475 A * | 2/1989 | Sirinyan et al. ............... 95/56 |
| 4,857,080 A * | 8/1989 | Baker et al. .................... 95/56 |
| 4,955,993 A | 9/1990 | Sanders, Jr. et al. |
| 5,236,474 A * | 8/1993 | Schofield et al. .............. 96/10 |
| 5,348,569 A * | 9/1994 | Bikson et al. .................. 95/55 |
| 5,498,278 A * | 3/1996 | Edlund ............................ 96/11 |
| 5,693,230 A | 12/1997 | Asher |
| 5,931,987 A * | 8/1999 | Buxbaum ......................... 95/55 |
| 5,989,319 A * | 11/1999 | Kawae et al. .................... 96/11 |
| 6,964,697 B2 | 11/2005 | Pan et al. |
| 7,022,165 B2 | 4/2006 | Paglieri et al. |
| 7,087,211 B2 * | 8/2006 | Balachandran et al. ......... 95/56 |
| 7,459,084 B2 * | 12/2008 | Baig et al. ...................... 210/640 |
| 2005/0241477 A1 * | 11/2005 | Mundschau et al. ............. 95/56 |
| 2011/0030382 A1 * | 2/2011 | Eadon et al. ..................... 95/55 |

* cited by examiner

*Primary Examiner* — Jason M Greene
(74) *Attorney, Agent, or Firm* — Mark E. Fejer

(57) ABSTRACT

A method and apparatus for separation of $H_2$ gas from a gaseous mixture utilizing an $H_2$ gas permeable metallic membrane supported directly on a porous substrate made up of at least one porous polymeric hollow fiber. In accordance with one preferred embodiment, the porous substrate is made up of a plurality of porous polymeric hollow fibers, forming a porous hollow fiber membrane. In accordance with one embodiment, a cooling fluid is disposed in contact with the hollow fiber, thereby enabling advantageous operation of the $H_2$ gas separation process at elevated temperatures in the range of about 200° F. to about 800° F.

11 Claims, 1 Drawing Sheet

SUPPORTED METAL MEMBRANE WITH INTERNAL COOLING FOR $H_2$ SEPARATION

BACKGROUND OF THE INVENTION

1. Field of the Invention

This invention relates to membranes for molecular hydrogen ($H_2$) gas separation from a gas mixture. In one aspect, this invention relates to metallic membranes for $H_2$ separation. In another aspect, this invention relates to metallic membranes for $H_2$ separation at high temperatures. In another aspect, this invention relates to supported metallic membranes for $H_2$ separation. In yet another aspect, this invention relates to metallic membranes disposed directly on and supported by hollow fiber membranes. In another aspect, this invention relates to metallic membranes supported on polymeric hollow fiber membranes.

2. Description of Related Art

Solid hydrocarbon fuels such as coal and biomass are converted to gaseous fuels at high temperatures by partial oxidation with air and/or steam. Exemplary of such conversions are processes taught by U.S. Pat. Nos. 4,057,402 and 4,369,045 (coal gasification) and U.S. Pat. Nos. 4,592,762 and 4,699,632 (biomass gasification). Synthesis gases produced by these processes comprise primarily hydrogen and carbon monoxide, typically with a hydrogen/CO molar ratio in the range of about 0.6 to about 6.0. Because of the abundance of solid hydrocarbon fuels, they are potentially major sources of hydrogen, particularly if cost effective means for extracting the hydrogen from the gaseous fuel products can be devised.

Gasification of solid hydrocarbon fuels is carried out at high temperatures in the range of about 600° C. to about 1400° C. Although these temperatures favor the kinetics of chemical reactions, materials selection for use in hydrogen separation is often limited to ceramics.

Hydrogen forming reaction systems such as steam/methane reforming wherein methane and water are reacted to form carbon dioxide and hydrogen and water-gas-shift reaction systems wherein carbon monoxide is reacted with water to form carbon dioxide and hydrogen are also well known in the art. Steam/methane reforming is used as a catalytic reaction system for the production of hydrogen. Conventional catalytic systems for steam/methane reforming require catalytic reaction temperatures on the order of 1800° F. followed by purification processes including acid gas removal and hydrogen purification. The water-gas-shift reaction is frequently used following gasification of naturally occurring carbonaceous materials, such as coal, peat, oil shale, and the like, wherein the product gas temperatures must be lowered to about 750° F. to drive the water-gas-shift reaction.

Membranes have been used to recover or isolate a variety of gases, including hydrogen, helium, oxygen, nitrogen, carbon monoxide, carbon dioxide, water vapor, hydrogen sulfide, ammonia, and/or light hydrocarbons. Applications of interest include the separation of hydrogen from gas mixtures containing gases such as nitrogen, carbon monoxide, carbon dioxide, and/or light hydrocarbons in addition to hydrogen.

Such membrane separations are based on the relative permeability of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the gas mixture. The gas mixture is thereby separated into a stream which is enriched in the selectively permeating gaseous component or components and a stream which is depleted in the selectively permeating gaseous component or components.

The use of metallic foils, films or membranes for separating gaseous mixtures, particularly hydrogen, is well known. See, for example, U.S. Pat. No. 1,174,631, which teaches hydrogen separation from a gaseous mixture using a thin sheet or film of platinum or palladium at a temperature preferably above about 1470° F., and U.S. Pat. No. 2,773,561, which teaches purification of hydrogen by permeation through a thin film of silver-palladium under a pressure differential between opposite sides of the film. $H_2$ permeates through metals under a solubility/diffusion mechanism with pressure differential providing the driving force. However, while a thin film of metal is desirable to minimize the diffusion path, such thin metal films require a support to withstand high pressure differentials. In addition, higher temperatures also increase the permeability of $H_2$ through the metal membrane.

Membranes for gas separation also have been fabricated from a wide variety of polymeric materials, including cellulose esters, polyimides, polyaramids, and polysulfones. An ideal gas separation membrane is characterized by the ability to operate under high temperature and/or pressure while possessing a high gas separation factor (selectivity) and high gas permeability. The problem is finding membrane materials which possess all the desired characteristics. Polymers possessing high gas separation factors generally have low gas permeabilities, while those polymers possessing high gas permeabilities generally have low gas separation factors. In the past, a choice between a high separation factor and a high gas permeability has been unavoidably necessary. Furthermore, some of the membrane materials previously used suffer from the disadvantage of poor performance under high operating temperatures and pressures.

Conventional $H_2$ permeable hollow fiber membranes are polymeric and are used, for example, in ammonia production. Hollow fiber membranes are a preferred membrane configuration for gas separation applications because of their high surface area/volume ratio. However, these membrane materials do not provide the near perfect selectivity to only $H_2$ permeating through the membrane barrier as obtained by metal membranes.

SUMMARY OF THE INVENTION

It is one object of this invention to provide a method and apparatus for separation of $H_2$ from a gaseous stream at high temperatures.

It is another object of this invention to provide a membrane suitable for separation of $H_2$ from a gaseous stream at high temperatures.

These and other objects of this invention are addressed by a composite membrane for $H_2$ separation comprising an $H_2$ gas permeable metallic membrane disposed directly on a porous substrate comprising at least one porous hollow fiber for support. By "directly" we mean without intermediate elements between the metallic membrane and the porous substrate. In accordance with one preferred embodiment of this invention, said porous substrate is a porous hollow fiber membrane comprising a plurality of porous hollow fibers. Because the materials used to produce the composite membrane of this invention have different thermal expansion coefficients and will therefore grow and shrink at different rates under thermal changes, materials of construction must be carefully selected to ensure that the metallic membrane or film stays on the porous hollow fibers. The maximum operating temperature is set by the stability temperature of the hollow fiber substrate.

The porous hollow fiber membrane employed in the composite membrane of this invention is made from engineered plastic materials that can withstand temperatures from about 200° F. to about 800° F. In one aspect of this invention, a fluid may be introduced into the lumen of the hollow fibers to keep the temperature of the plastic material within its safe operating range and remove the $H_2$ gas that permeated through the metal membrane. The thermal stability of the composite membrane is managed both by selecting the right materials and by heat management from within the membrane using a heat transfer fluid. Thus, the composite membrane of this invention combines the high selectivity to $H_2$ permeation obtainable with a thin metal film with the high surface area achievable with a polymeric membrane. The use of the heat transfer fluid in the lumen maintains the stability of the support membrane to allow the composite membrane to operate at higher temperature conditions than can otherwise be achieved. The hollow fiber modules are easily fabricated, installed, and maintained using conventional techniques.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
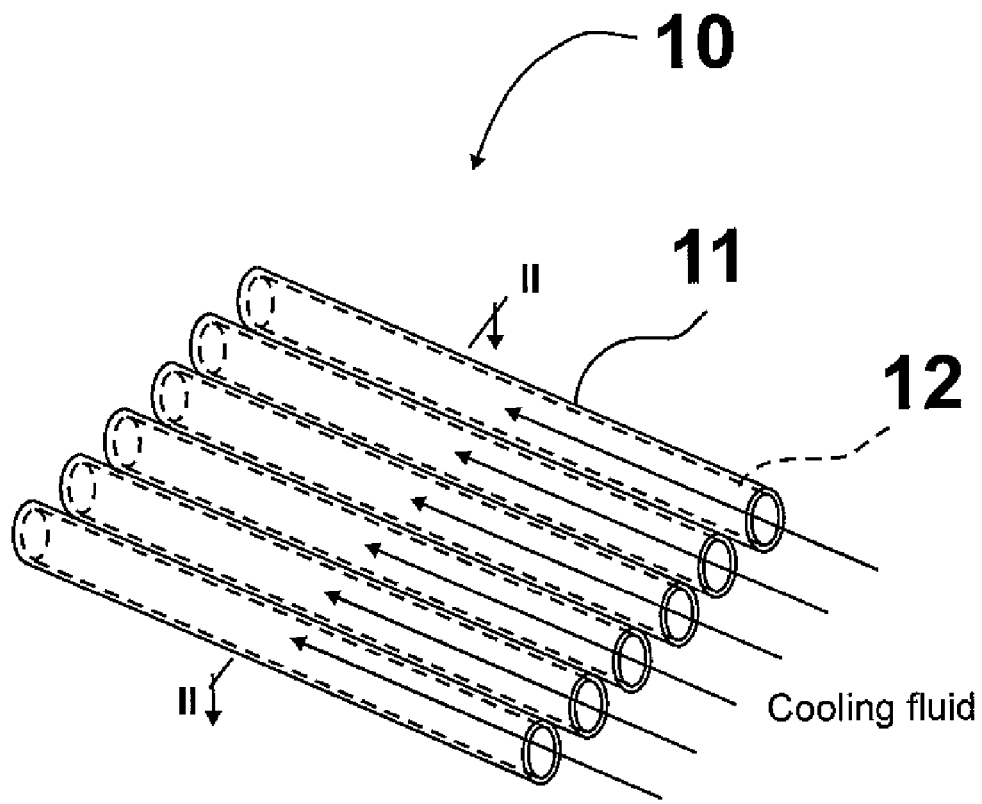
FIG. 1 is a schematic perspective view of a composite membrane in accordance with one embodiment of this invention.
Figure 2:
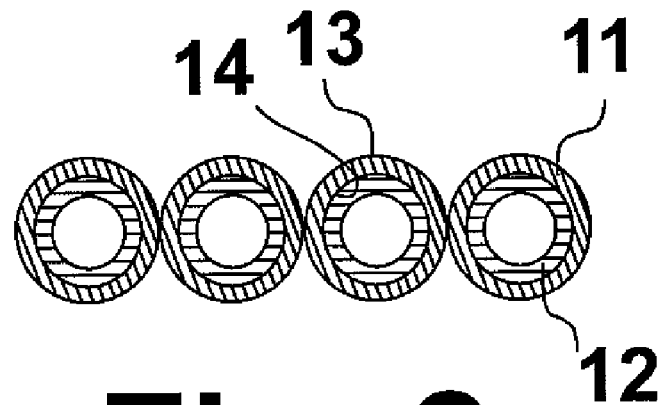
FIG. 2 is a cross-sectional view of the composite membrane in FIG. 1 taken along the line II-II in accordance with one embodiment of this invention.

This invention combines the high selectivity to $H_2$ permeation obtainable with a thin metal film with the high surface area achievable with a polymeric membrane. The invention disclosed herein, as shown in FIGS. 1 and 2, is a composite membrane 10 comprising a $H_2$ gas permeable metallic membrane 11, also sometimes referred to as a metallic film or metallic foil, having a gas contact side 13 and a gas permeate side 14, supported on porous hollow fibers 12 disposed on said gas permeate side, which hollow fibers are open on both ends thereof. To maximize available surface area for $H_2$ gas permeation, each of the hollow fibers 12 may be coated with a suitable metallic membrane material. It will be appreciated that the metallic film or metallic foil may be disposed on the inside surface of the porous hollow fibers, and such embodiments are deemed to be within the scope of this invention.

The metallic membrane is made from a class of materials capable of permeating $H_2$ gas. As used herein, the term "metallic" refers to metals, metal alloys, and combinations thereof. Metallic materials suitable for permeating $H_2$ gas are well known. See, for example, U.S. Pat. No. 7,022,165 B2 to Paglieri et al. In operation, $H_2$ gas on the gas contact side of the metallic membrane permeates through the metallic membrane in accordance with a solubility/diffusion mechanism where pressure differential between the gas contact side and the gas permeate side provides the driving force. A thin film of metallic material is desirable to minimize the diffusion path. By "thin", we mean membranes having a thickness in the range of about 0.05 µm to about 25 µm. However, a thin metallic film or membrane requires a support to withstand the high pressure differential employed in such systems. In addition, operation at higher temperatures increases the permeability of $H_2$ gas through the metallic foil.

Conventional $H_2$ hollow fibers and hollow fiber membranes are made from polymeric materials and are used, for example, in ammonia production. However, these materials do not provide the near perfect selectivity to only $H_2$ gas permeating through the membrane barrier as obtained by metallic membranes. Hollow fibers may be fabricated into high surface area modules that greatly reduce the size and weight of the separation device compared with coated flat sheets. Because the porous hollow fibers and membranes are used as a support rather than as a separation layer, the fibers have an open pore structure to minimize resistance to gas flow rather than an asymmetric or dense layer as typically employed in hollow fiber separators. A porous material having an open pore structure is a material in which the walls of the individual pores themselves are porous, thereby enabling the passage of a fluid from pore to pore until it passes entirely through the porous material.

The porous hollow fibers and porous hollow fiber membrane upon which the $H_2$ gas permeable metallic membrane is supported are made from engineered plastic materials that are able to withstand temperatures in the range of about 200° F. to about 800° F. That is, the plastic materials are able to retain their pore structure and maintain a strong bond with the metallic membrane at the desired temperature. In accordance with one preferred embodiment of this invention, the porous hollow fibers and membrane are produced from engineered polymeric materials selected from the group consisting of polyimides, polyketones, polyaramids, polyesters, fluoropolymers and mixtures and combinations thereof.

As previously indicated, one of the benefits of utilizing metallic membranes for $H_2$ gas permeation is the ability of the metallic membranes to sustain operation at temperatures in the range of about 200° F. to about 800° F. In accordance with one embodiment of this invention, membrane cooling means for maintaining the temperature of the plastic material used to produce the porous hollow fibers within a safe operating range and for bringing out the $H_2$ gas that permeates through the metallic membrane is provided. In accordance with one embodiment of this invention, said membrane cooling means are in the form of a cooling fluid which is flowed through the lumen of the hollow fibers or disposed around the exterior of the hollow fibers depending upon the disposition of the metallic membrane or foil on the inside or outside surface of the porous hollow fibers. Suitable membrane cooling fluids in accordance with one embodiment of this invention are selected from the group consisting of silicone oil, mineral oil, aromatic hydrocarbons, paraffinic hydrocarbons, water, brine, glycols and mixtures thereof.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:
1. An apparatus for $H_2$ separation comprising:
  an $H_2$ gas permeable metallic membrane supported directly on a porous substrate comprising at least one porous hollow fiber having two open ends; and
  membrane cooling means for liquid cooling said at least one hollow fiber.

2. The apparatus of claim 1, wherein said porous substrate comprises a plurality of said porous hollow fibers, forming a porous hollow fiber membrane.

3. The apparatus of claim 1, wherein said at least one porous hollow fiber is made of a polymer that is stable at a temperature in a range of about 200° F. to about 800° F.

4. The apparatus of claim 3, wherein said polymer is selected from the group consisting of polyimides, polyketones, polyaramids, polyesters, fluoropolymers and mixtures and combinations thereof.

5. The apparatus of claim 1, wherein said membrane cooling means comprises a liquid cooling fluid one of in a lumen of said porous hollow fiber and around an exterior of said porous hollow fiber in contact with said porous hollow fiber.

6. The apparatus of claim 5, wherein said liquid cooling fluid is selected from the group consisting of silicone oil, mineral oil, aromatic hydrocarbons, paraffinic hydrocarbons, water, brine, glycols and mixtures thereof.

7. The apparatus of claim 1, wherein said at least one porous hollow fiber comprises an open pore structure.

8. A method for separation of $H_2$ gas from a mixture comprising said $H_2$ gas comprising the steps of:

contacting a composite membrane comprising an $H_2$ gas permeable metallic membrane disposed directly on at least one porous hollow fiber substrate having two open ends with said mixture on a metallic membrane side of said composite membrane at a temperature in a range of about 200° F. to about 800° F., whereby said $H_2$ gas permeates through said metallic membrane to a permeate side of said metallic membrane; and contacting one of an interior surface and an exterior surface of said at least one porous hollow fiber substrate with a liquid cooling fluid.

9. The method of claim 8, wherein said $H_2$ gas flows into a lumen of said at least one porous hollow fiber substrate and is carried away from said composite membrane with said liquid cooling fluid.

10. The method of claim 8, wherein said liquid cooling fluid is selected from the group consisting of silicone oil, mineral oil, aromatic hydrocarbons, paraffinic hydrocarbons, water, brine, glycols and mixtures thereof.

11. The apparatus of claim 5, wherein said membrane cooling means further comprises circulation means for circulating said liquid cooling fluid one of in said lumen of said porous hollow fiber and around said exterior of said porous hollow fiber in contact with said porous hollow fiber.

* * * * *